US009373169B2

(12) United States Patent
Varekamp et al.

(10) Patent No.: US 9,373,169 B2
(45) Date of Patent: Jun. 21, 2016

(54) DETERMINATION OF A POSITION CHARACTERISTIC FOR AN OBJECT

(75) Inventors: Christiaan Varekamp, Eindhoven (NL); Patrick Luc E. Vandewalle, Eindhoven (NL); Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 755 days.

(21) Appl. No.: 13/519,363

(22) PCT Filed: Jan. 10, 2011

(86) PCT No.: PCT/IB2011/050084
§ 371 (c)(1),
(2), (4) Date: Jun. 27, 2012

(87) PCT Pub. No.: WO2011/086484
PCT Pub. Date: Jul. 21, 2011

(65) Prior Publication Data
US 2012/0287266 A1 Nov. 15, 2012

(30) Foreign Application Priority Data

Jan. 12, 2010 (EP) .................................. 10150478
Mar. 25, 2010 (EP) .................................. 10157685

(51) Int. Cl.
*H04N 7/18* (2006.01)
*G06T 7/00* (2006.01)
(52) U.S. Cl.
CPC ..................................... *G06T 7/004* (2013.01)
(58) Field of Classification Search
CPC ....................................................... G06T 7/004
USPC ........................................................ 348/135
See application file for complete search history.

(56) References Cited

U.S. PATENT DOCUMENTS 4,507,654 A 3/1985 Stolarczyk et al.
4,609,909 A 9/1986 Miller et al.
(Continued)

FOREIGN PATENT DOCUMENTS

JP 2000115810 A 4/2000
JP 200561894 A 3/2005
(Continued)

OTHER PUBLICATIONS

Jovanovic et al: "Object Detection in Flatland"; ADVCOMP '09 Proceedings of the 2009 Third International Conference on Advanced Engineering Computing and Applications in Sciences, IEEE Computer Society, pp. 95-100.
(Continued)

*Primary Examiner* — Farzana Hossain
*Assistant Examiner* — Matthew Kwan

(57) ABSTRACT

A system for determining a position characteristic for an object in a room comprises an optically identifiable element (103) positioned on a background surface for a detection area of the room. A camera (101) is positioned across the detection area from the optically identifiable element (103) and captures an image comprising the detection area and the optically identifiable element (103). A detector (403) detects the optically identifiable element (103) in the image based on an optical property. An occlusion processor (405) determines an occlusion property for an occlusion of the optically identifiable element (103) in the image in response to the optical property. A position processor (407) determines a depth position in response to the occlusion property where, the depth position is indicative of a position of the object along the optical axis of the camera (101). The invention may for example allow presence detection and rough localization of a person in a room.

16 Claims, 12 Drawing Sheets

(56) References Cited

U.S. PATENT DOCUMENTS

| | | |
|---|---|---|
| 6,278,373 B1 | 8/2001 | Jaurigue et al. |
| 6,411,215 B1 | 6/2002 | Shnier |
| 6,546,356 B1 | 4/2003 | Genest |
| 7,643,024 B2 * | 1/2010 | Bell et al. .................. 345/419 |
| 2007/0081695 A1 * | 4/2007 | Foxlin et al. ................ 382/103 |
| 2007/0122000 A1 * | 5/2007 | Venetianer et al. .......... 382/103 |
| 2008/0056536 A1 * | 3/2008 | Hildreth et al. .............. 382/103 |
| 2008/0074261 A1 | 3/2008 | Zimmerman |
| 2009/0121017 A1 | 5/2009 | Cato et al. |

FOREIGN PATENT DOCUMENTS

| | | |
|---|---|---|
| TW | 561423 B | 11/2003 |
| TW | 200745539 | 12/2007 |
| WO | 2009037914 A1 | 3/2009 |

OTHER PUBLICATIONS

Forsyth et al: "Computer Vision: A Modern Approach"; Pearson Education, Inc., Chapter 2 Titled "Geometric Camera Models"; 2003.

Varekamp et al: "Measurement of Feet-Ground Interaction for Real-Time Person Localization, Step Characterization, and Gaming"; Proceedings of the 7th International Conference on Methods and Techniques in Behavioral Research, Aug. 24, 2010, pp. 277-280.

Cucchiara et al: "A Multi-Camera Vision System for Fall Detection and Alarm Generation"; Expert Systems, Nov. 2007, vol. 24, No. 5.

\* cited by examiner

DETERMINATION OF A POSITION CHARACTERISTIC FOR AN OBJECT

FIELD OF THE INVENTION

The invention relates to a determination of a position characteristic for an object and in particular, but not exclusively, to determination of a depth position for a creature in a room.

BACKGROUND OF THE INVENTION

Determination of positions of objects and in particular of living beings, such as humans or pets, is of increasing interest in many applications. Position estimates may for example be used for the prevention and/or detection of accidents. For example, it may be used to detect that an elderly person has fallen down or that a small child climbs on a table with the risk of falling down. However, estimations of (in particular) positions of creatures in a room may be particularly difficult as the algorithms must take into account that many parameters and characteristics of the environment will be varying with time and/or will be unknown. For example, the specific characteristics of the object that is to be detected may be unknown, and the different objects present in the room may not only vary with time but may also be unknown to the algorithm.

In order to monitor a room for e.g. the purpose of accident prevention, it would be ideal to obtain and analyse a complete picture of what is happening in the room. Such a complete picture may be obtained from one or more video cameras that capture a dynamic image of the desired area. However, the interpretation of the images from such cameras is very complex, and in particular it is very difficult to reliably identify the image segments corresponding to the objects of interest (such as human beings). This may specifically be difficult as the characteristics of the objects, such as the position in the room, will be unknown to the algorithm. Further, the image objects corresponding not only to the objects of interest but also to other objects in the room will tend to be very complex and the correct analysis and evaluation of these objects will tend to require very complex processing and lead to unreliable results.

An example of a video system is presented in US patent publication 2009/0121017. In the system, inventory items are positioned in front of a wall with a recognisable optical pattern. A camera captures the image and detects the amount of exposed surface of the wall by evaluating the area that has the recognisable optical pattern. The amount of exposed surface is then used to determine an amount of the inventory items that are present or missing. However, the system of US patent publication 2009/0121017 merely provides the detection of whether inventory objects are present or not and thus provides only a minimum of information.

Hence, an improved system for determining a depth position for an object in a room would be advantageous and in particular a system allowing increased flexibility, or increased reliability, or facilitated implementation and/or operation, or improved adaptability to dynamic variations and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided system for determining a position characteristic for an object (living being, robot or other mechanical toy, ball, etc.), e.g. in a room (or outside on a sandy field, or applied on houses near a pedestrian crossing or school, etc.), the system comprising: an optically identifiable element for positioning typically on a ground surface or at least close to ground level, e.g. stuck on a background surface for a detection area of the room such as a wall of the room or a couch or cupboard in the room, the optically identifiable element having an optical property (e.g. a specific color, or texture at least over a partial region of the object, which color and/or texture may have a complex relation to discriminate spatial regions of the optically identifiable element); a camera for positioning across the detection area from the optically identifiable element, the camera being arranged to capture an image comprising the detection area and the optically identifiable element; a detector for detecting the optically identifiable element in the image in response to the optical property; an occlusion processor for determining an occlusion property of at least one occlusion of the optically identifiable element in the image in response to the optical property; and a position processor for determining a depth position in response to the occlusion property, the depth position being indicative of a position of the object along an optical axis of the camera.

The invention may provide improved and/or facilitated determination of a depth position for an object in a room. In particular, object detection and/or characterization may be improved as depth positions relating to a distance to the camera along the optical axis may be taken into account. The invention may allow improved object characterization/detection while allowing low complexity. Reliable determination of the depth position is achieved from a simple setup and/or the required signal and image processing may be substantially facilitated. In particular, relatively low complexity occlusion determination, characterization and processing can be used.

The invention may for example allow an improved detection and/or characterization of people in a room and may e.g. allow improved accident detection, intruder detection etc.

The optical property may e.g. be a specific colour and/or pattern. The optical property may specifically have a particular spectral distribution and may be invisible to a human, i.e. it may have an ultraviolet or infrared spectrum detectable by a suitable camera.

The occlusion property may include an indication of one or more image areas that correspond to the optically identifiable element but which do not have optical characteristics matching the optical property. The occlusion property may include an indication of one or more segments of the optically identifiable element that are occluded in the image. The occlusion property may e.g. include a position and/or size of such occluded segments. The position and/or size may specifically be an image position and/or size or may be derived from these.

A depth position may specifically indicate a position along the optical axis. Specifically, a depth position may be indicative of a position of the object in a direction perpendicular to the image plane of the image.

In accordance with an optional feature of the invention, the optically identifiable element is an elongated element applied to a wall and being spatially limited to below half a height of the wall (e.g. a number of thin gluable strips of 10 cm high, to be applied on partial regions of the wall).

This may provide particularly advantageous and/or facilitated implementation and/or operation in many embodiments. E.g., it may reduce the visual impact while providing accurate object detection and may exploit the fact that most objects (including people) may extend from the floor of the room.

The optically identifiable element may e.g. be an article that can be applied or attached to a wall, specifically in a fixed position.

The optically identifiable element may e.g. be a tape, adhesive strip or paint that can be applied to the wall. The optically identifiable element may be an elongated element (which may of course be composed of several less elongated subelements—e.g. tiles—forming together the optically identifiable element) which has a width (or length) substantially higher than the height (e.g. at least 10 times higher). The optically identifiable element may e.g. be an element extending less than 5-10 cm in one direction (typically substantially vertically) and more than 1 meter in a direction perpendicular thereto (typically substantially vertically). The optically identifiable element may be substantially rectangular.

The optically identifiable element may be placed on a wall proximal to a floor of the room. For example, the largest distance from the floor to a part of the optically identifiable element may no more than 50 cm, 20 cm, 10 cm, 5 cm or even 1 cm. This may provide improved detection of e.g. feet which are particularly relevant for e.g. detecting a presence of a person. It may also reduce the visual impact of the optically identifiable element. In some scenarios, the optically identifiable element may extend upwards from the intersection of the wall with the floor of the room.

The optically identifiable element may contain a calibration pattern to facilitate position calibration. For instance, a red fluorescent tape can contain a 1 cm wide black part every 1 m along the tape length. If we assume that the wall is straight the camera sensors can detect the black parts since these form occlusions. The camera sensors can use them to establish a relation between camera coordinates and room coordinates. The width of the black mark could encode the absolute room coordinate. If the marks become too wide, they could be made detachable and be removed after the system calibration step. Also only a couple of simple markers may reside on the optically identifiable element, to designate the start or end of meaningful subareas (a region surrounding a precious object, or a marker allowing kids to build a new room in a virtual house they can construct with the optically identifiable element, etc.). Note that these markers need not necessarily be permanent, e.g. they can be glued and detached as a second strip and removed again at will, or even be projected, which may be useful for dynamic reconfigurable games (like a playing board mapped into the room which changes after having completed a level). However these markers can help in calibrating, i.e. identifying a relationship between the present system and its optically identifiable element and particular meaningful regions of the room or space the system resides in.

The optically identifiable element does not need to be attached to a wall. It may also be placed on the ground without attaching it to the wall. Furthermore, the optically identifiable element may be deformable such that it can be placed around people or furniture. In this form the optically identifiable element may be attached to or painted on a rope or any other suitable material (wood, clothing, etc). The optically identifiable element may even form a closed loop. The camera may also be integrated in the optically identifiable element.

In accordance with an optional feature of the invention, the position processor is arranged to determine an image object of the image associated with an occluded segment of the optically identifiable element; and to generate the depth position in response to an image characteristic of the image object.

This may provide a particularly efficient, reliable, and/or low complexity determination of the depth position.

The image object may be determined by image segmentation (if a simple characterization such as length of a foot is desired in the application, the segmentation algorithm may be simple, and for other applications it may be more complex). The image object may comprise pixels having values that meet a match criterion relative to pixel values of pixels which correspond to an occluded segment. For example, the image object may be determined to include pixels in an image area within which the colour varies by less than a given amount from the colour of the occluded segment.

The image characteristic may specifically be a dimension of the image object.

In accordance with an optional feature of the invention, the image characteristic is indicative of an extension of the image object in an image direction away from the optically identifiable element.

This may provide a particularly efficient, reliable, and/or low complexity determination of the depth position.

In accordance with an optional feature of the invention, the position processor is arranged to: detect a further image object corresponding to a floor of the room; determine a segment border between the image object and the further image object; and determine the depth position in response to an image distance between the optically identifiable element and the segment border.

This may provide a particularly efficient, reliable, and/or low complexity determination of the depth position.

In accordance with an optional feature of the invention, the system further comprises: a further camera for positioning across the detection area from the optically identifiable element, the further camera capturing a further image comprising the detection area and the optically identifiable element; and wherein the detector is further arranged to detect the optically identifiable element in the further image in response to the optical property; the occlusion processor is arranged to determine a further occlusion property of at least one occlusion of the optically identifiable element in the further image in response to the optical property; and the position processor is arranged to determine the depth position in response to both the occlusion property and the further occlusion property.

This may provide a particularly efficient, reliable, and/or low complexity determination of the depth position. In many scenarios, the approach may allow a reduced complexity signal processing and/or a more reliable determination.

The further camera and associated processing may be a similar to the first camera. The further occlusion property may e.g. include a position and/or size of occluded segments of the optically identifiable element. The position and/or size may specifically be an image position and/or size or may be derived therefrom. The occlusion property and the further occlusion property may specifically comprise position and/or size indications for corresponding occlusions. Such corresponding occlusions may originate from the same object and specifically from the object for which the depth position is obtained.

In accordance with an optional feature of the invention, the position processor is arranged to determine the depth position in response to a difference in relative image positions between occluded segments in the image and the further image.

This may provide a particularly efficient, reliable, and/or low complexity determination of the depth position. In many scenarios, the approach may allow a reduced complexity signal processing and/or a more reliable determination.

The depth position may in particular be determined in response to a shift in position for one or more corresponding occluded segments in the two images. The displacement between occluded segments estimated to correspond to the object may be determined, and a position along the optical axis may be determined based on the displacement.

In accordance with an optional feature of the invention, the system of further comprises a size processor arranged to determine a size estimate for the object in response to the depth position and an image size of at least one occluded image segment of the optically identifiable element.

This may provide an improved operation for many applications. For example, it may allow an improved detection of a presence of a person or an animal etc. The approach may in particular provide not only additional information but may also reduce sensitivity for the actual position of the object in the room. For example, it may allow a differentiation between smaller objects closer to the camera and larger objects further away from the camera. As another example, the approach may be used to distinguish between a child and an adult or to differentiate between a standing or walking person and a person that has fallen on the ground.

In accordance with an optional feature of the invention, the object is a creature, and the system further comprises a detection processor for detecting a presence of the creature in the detection area in response to the occlusion property.

The invention may allow an improved detection of a presence of a person or an animal in a room. Such detection is typically very complex and unreliable as the specific characteristics, position and movement is unknown. The system may allow an improved detection using a low complexity set-up and simplified approach. For example, uncertainties may be reduced or compensated for by the setup and e.g. the information provided by the depth position.

In accordance with an optional feature of the invention, the detection processor is arranged to detect the presence in response to a dynamic variation of an occlusion of the optically identifiable element in the image.

The invention may allow an improved detection of a presence of a person or an animal in a room. Indeed, rather than merely relying on a static object being positioned at a specific location the approach may allow detection of freely moving creatures and may indeed base the detection on the resulting dynamic variation in the occlusion property. The dynamic variation may for example be a variation of a position of an occlusion segment and/or duration of an occlusion.

In some embodiments, the dynamic variation may comprise a variation in a position of an occluded segment of the optically identifiable element.

In some embodiments, the dynamic variation may comprise a detection of an occlusion having a temporal characteristic meeting a criterion. For example, the criterion may be that the occlusion has duration of less than a given time. In accordance with an optional feature of the invention, the detection processor is further arranged to determine a first characteristic of at least one of the creature and an activity of the creature in response to the dynamic variation.

This may provide additional information and/or may e.g. improve reliability of detection. The characteristic may for example be a movement characteristic of the creature, such as a speed, a gait, a size indication (e.g. of the feet of a person) etc. In more complex embodiments, detailed analysis of the exact occluding shape change over time can be used for e.g. estimating what a person or animal is doing by analysing movement, such as e.g. a typical pattern of somebody trying to get up, or a sick convulsing animal.

In accordance with an optional feature of the invention, the detector is arranged to estimate a geometric area of the image corresponding to the optically identifiable element in response to detections of image areas having an image property matching the optical property, and the occlusion processor is arranged to identify occluded segments of the geometric area having an image property not matching the optical property.

This may allow a particularly efficient, reliable, and/or low complexity operation. The occluded segments of the geometric area having a different optical property than the optical property of the optically identifiable element may specifically comprise an area of pixels that do not meet a match criterion relative to the optical property.

In accordance with an optional feature of the invention, the detector is arranged to determine the geometric area by performing a matching of the image areas to a predetermined geometric shape.

This may allow a particularly efficient, reliable, and/or low complexity operation.

The geometric area may be determined in response to the optical property and a predetermined geometric shape corresponding to a geometric shape of the optically identifiable element. For example, the optically identifiable element may be a narrow strip which will correspond to a line in the image (linear occlusion analysis may be done at an optimal height along the strip for the application, e.g. ground contact level, or a higher level to avoid interfering ground level occlusions e.g. from a product conveyor belt). The predetermined geometric shape may accordingly be a line and the geometric area may be determined as a line image object comprising pixels with an image characteristic matching the optical property. For example, a line fit for pixels or image segments with pixel characteristics matching the optical property may be performed.

In accordance with an optional feature of the invention, the system is further arranged to determine a set of nominal occluded segments of the optically identifiable element in the room; and wherein the position processor is arranged to compensate the occlusion property for the nominal occluded segments.

This may provide improved operation and may in particular provide an improved flexibility. The approach may for example in many scenarios allow the system to be used in rooms where other objects may occlude the optically identifiable element.

The nominal occluded segment may be one which is considered to be static and/or one for which the occlusion is not caused by the object. It may typically be an occlusion caused by another object in the detection area.

The compensation may for example be performed by ignoring all occlusions that correspond to a nominal occluded segment.

The nominal occluded segments may e.g. be determined as occluded segments of the optically identifiable element in a calibration image. The calibration image may be an image captured without the presence of the object.

In accordance with an optional feature of the invention, the system is further arranged to designate an occluded segment of the optically identifiable element as a nominal occluded segment if a duration of the occlusion exceeds a threshold.

This may provide particularly advantageous performance and may in particular allow the system to automatically adapt to the characteristics of the room. For example, it may automatically adapt the processing to compensate for other objects in the detection area as these may in many scenarios be considered static whereas the object of interest is typically non-static (e.g. in many applications it will be a person or an animal).

The threshold may be a static threshold. For example, in many embodiments for detecting humans, it may advantageously be in the interval from 15 seconds to 1 minute. In some embodiments, the threshold may be dependent on other parameters and may be a dynamic varying threshold.

According to an aspect of the invention there is provided a method of determining a position characteristic for an object in a room, the method comprising:

positioning an optically identifiable element on a background surface for a detection area of the room, the optically identifiable element having an optical property; positioning a camera across the detection area from the optically identifiable element, the camera capturing an image comprising the detection area and the optically identifiable element; detecting the optically identifiable element in the image in response to the optical property; determining an occlusion property for an occlusion of the optically identifiable element in the image in response to the optical property; and determining a depth position in response to the occlusion property, the depth position being indicative of a position of the object along an optical axis of the camera.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
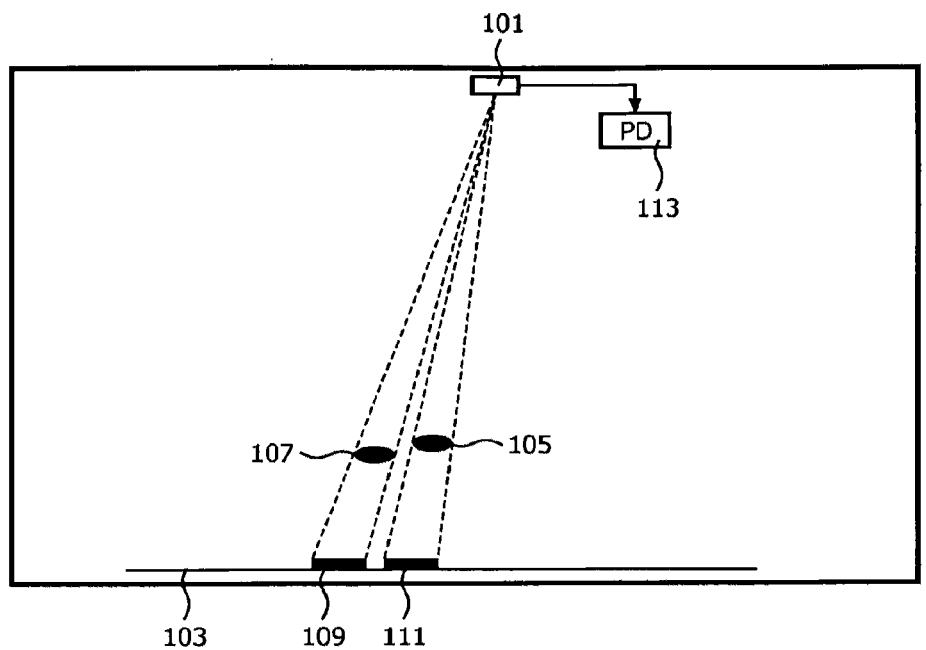
FIG. 1 is an illustration of a system for determination of a depth position in accordance with some embodiments of the invention.

The following description focuses on embodiments of the invention applicable to a system for detection of the presence of people in a room. However, it will be appreciated that the invention is not limited to this application but may be applied to many other applications and objects.

In the following, a system will be described which is arranged to determine characteristics of an object which may be placed in a room based on images captured by one or more video cameras. Specifically, a depth position may be determined which comprises an estimate of the position of a potential object in the room in a direction which is perpendicular to the image plane of the camera. Thus, the system may allow a determination of a position estimate for a position component along the optical axis of the camera. The system may in addition determine one or more position estimates for the object in a direction that is parallel to the image plane and may specifically determine a three dimensional position estimate. It will be appreciated that none of the determined position values need to be aligned with the optical axis but at least one depth position will have a projection of non-zero length along this axis, i.e. the depth position will include information of an estimated position along the optical axis and is not limited to only position information in the image plane. The camera will be mounted such that the depth position typically includes a position component along an axis that intersects both the camera and the optically identifiable element.

The described system is in particular useful for determining characteristics of objects for which little predetermined information is known. For example, it may be particularly suitable for detection of objects having unknown positions, geometries, sizes, etc. It may furthermore be particularly suitable for moving objects. In particular, the system has a high suitability for determining a property associated with creatures (humans or animals), that may enter and move around in a room. The system may indeed provide an advantageous detection of the presence or activity of a person in a room.

The system utilizes an optically identifiable element that is positioned on a background surface for a detection area of the room. A camera is positioned across from the optically identifiable element such that it captures a video signal comprising images that include the detection area and the optically identifiable element. The optically identifiable element has an optical property which allows it to be relatively easily and accurately detected in the video images. The system may then detect occlusions of the optically identifiable element which will typically be due to an object being located between the camera and the optically identifiable element. Thus, the presence of an object can be detected simply from the occlusion of the optically identifiable element in the video images. For clarity and simplicity, the following description will first focus on scenarios wherein the only object that may occlude the optically identifiable element is the object of interest, i.e. where there are no other objects in the detection area. However, subsequently it will be described how the system may compensate for the presence of other occluding elements.

The system thus evaluates the occlusion of the optically identifiable element and based on a property of this occlusion, a position indication for the position component along the optical axis of the camera is determined. Specifically, the occlusion property may include an indication of a position and/or size of one or more occluded segments of the optically identifiable element, and the position determination may be based on such positions and sizes.

FIG. 1 illustrates an exemplary setup in a room. A camera 101 is positioned along one wall of the room. In the example, the camera 101 is positioned proximal to the floor of the room and is specifically positioned no more than 50 cm, and often no more than 20 cm, 5 cm or even 2 cm above the floor. The location close to the floor provides improved operation and performance in many embodiments, and specifically it may improve detection and estimation of properties for persons in the room. Indeed, it may provide an image wherein a large image area covers the floor at a low angle which may be particularly suitable for the evaluation of characteristics associated with the feet of people in the room, or other low height objects such as balls, toy cars, plastic figures, etc. Not only can one with these cameras at suitable low positions in the room monitor intelligent moving objects, such as robots (e.g. robot vacuum cleaners), and e.g. use the additional data from these static cameras to aid also in the robot control, but also cameras mounted low on the robot itself can be using this system, or any moveable camera(s) (sets).

At the opposite wall of the room, an optically identifiable element 103 is placed. Similarly to the camera, the optically identifiable element is located proximal to the floor and it may specifically be no more than half the height of the wall. Indeed, in many embodiments, the optically identifiable element is no more than 50 cm, and often no more than 20 cm, 10 cm, or even 1 cm, above the floor at the highest point. The placement of both the camera 101 and the optically identifiable element 103 close to the floor provides a setup wherein occlusions of the optically identifiable element 103 in the image captured by the camera 101 can be assumed to be caused by objects that touch the floor, and the occlusions may be considered to correspond to the characteristics of the objects close to the point of contact with the floor. Specifically, the occlusion may be caused by the feet of a person in the room, and thus the setup may result in the occlusions being associated with a specific part of the body of a person.

Thus, the camera 101 captures an image of the room which includes the optically identifiable element 103 on the opposite wall. Any objects between the camera 101 and the optically identifiable element 103 will result in occlusions of the optically identifiable element 103 and these can be detected, characterized and used to determine a position of the object in the room. Thus, the camera 101 and optically identifiable element 103 define a detection area for the room which is the area in which the placement of an object would cause an occlusion of the optically identifiable element 103 in the captured image of the camera 101.

The optically identifiable element 103 may for example be a narrow strip that is attached or e.g. painted on the wall. For example, a reflective tape (e.g. bright red, orange or yellow) may be placed along the wall adjacent to the floor. In the specific example, the tape is placed to cover the wall at the bottom (wall/ground intersection). Typically, the tape may be 2 cm to 5 cm wide. In other embodiments, other means of providing an optically identifiable element on or at a wall may be used. For example, an ultraviolet or infrared reflective tape or paint may be used to provide an optically identifiable element that has detectable optical properties which are not visible to the human eye (and thus less intrusive) but may be detected by a camera. Yet in other embodiments, the optically identifiable element may consist of a combination of multiple tapes with differing color stacked parallel to each other thereby forming one new tape. This specific arrangement is likely to be more robust to the situation where a person's shoes have a color that is very similar to the color of the optically identifiable element which could result in a false negative. The multi-color tape would reduce the chance of such a false negative. E.g. there may be a rainbow color pattern repeatedly stacked horizontally or vertically along the strip.

In the example of FIG. 1, two objects 105, 107 are placed in the room and these may specifically be the feet of a person. Each of the objects occludes part of the optically identifiable element 103 when viewed from the camera 101. Thus, in the captured image, the optically identifiable element will be occluded in two occluded segments 109, 111.

(It will be appreciated that equivalently to considering the two occluded segments to be caused by two objects, they may be considered to originate from two parts of one object, i.e. the two objects 105, 107 may equivalently be considered to be two different parts of one object. Thus, one object may cause multiple occlusions).

Figure 2:
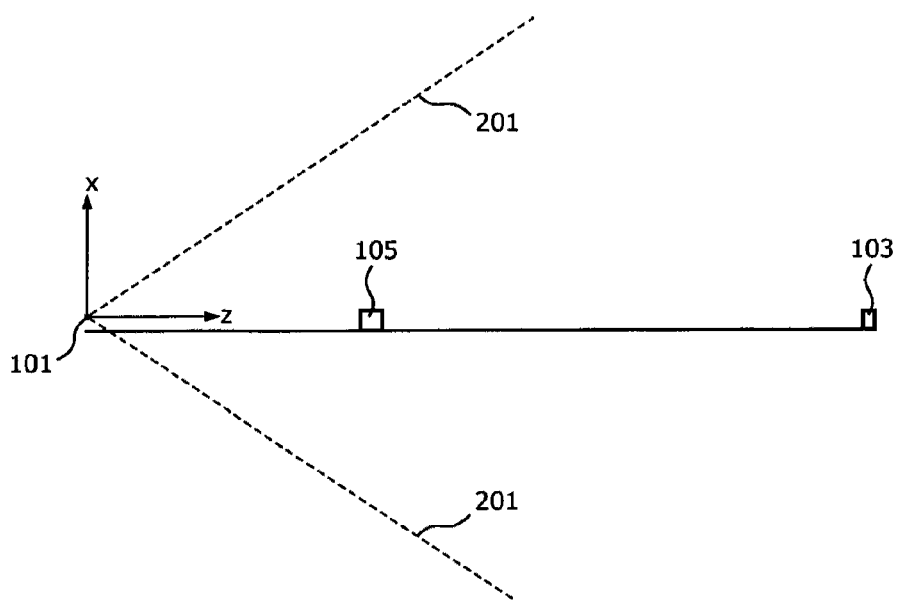
FIG. 2 illustrates an example of a geometry associated with the setup of FIG. 1.

FIG. 2 illustrates examples of a sideways view of the scenario of FIG. 1. In the example, a coordinate system is placed with a center coinciding with the camera 101. The axis along the optical axis of the camera is denoted the z-axis (i.e. in the example the z-axis is the direction perpendicular to the two walls and the image plane). The sideways direction (along the tape forming the optically identifiable element) is designated as the y axis and the perpendicular axis (the up/down direction in the example) is designated as the x axis. Thus, the x and y axes are in the image plane and the z-axis is perpendicular thereto. The camera has a viewing angle in the x-direction which is indicated by two lines 201.

Figure 3:
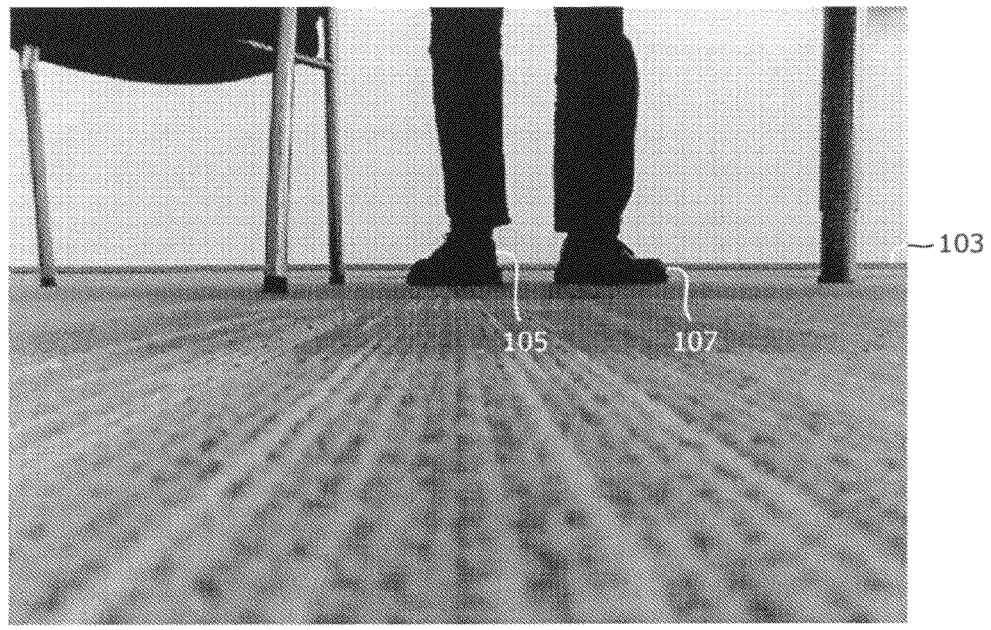
FIG. 3 is an illustration of an example of an image captured by a camera of the system of FIG. 1.

FIG. 3 illustrates an example of an image that may be captured by the camera 101. (The image also includes the presence of table and chair legs. The treatment of such objects will be discussed later but is for clarity and conciseness ignored in the following initial description). The image includes the optically identifiable element 103 and the feet of a person 105,107 resulting in the occlusions 109, 111 of the optically identifiable element 103. As can also be seen, the image covers a large part of the floor from a small height above the floor.

The system further comprises a processing device 113 which receives the images from the camera 101 and processes these to evaluate the presence or characteristics of any potential objects in the detection area.

Specifically, the processing device 113 analyzes the image to detect the optically identifiable element 103 based on the known optical property of this. If nobody (nothing) is present, then the optically identifiable element 103 is not occluded by any objects that touch the ground. However, as soon as a person crosses the space between the camera and the tape (the optically identifiable element 103), the feet of the person will obstruct part of the tape. This occlusion is detected and analyzed by the processing device 113 which then proceeds to determine a position estimate for the object causing the occlusions.

Since the optically identifiable element properties (bright color and/or reflectivity) are known and are selected to typically differ from the color of a person's shoes or socks (e.g. for the male resident dark brown or blue), the presence of human feet is easily detected by finding the pixels in the image which are expected to have the characteristics of the optically identifiable element 103 but which no longer have these properties. This exemplary male user with only black or brown shoes, may choose to cover his left wall with a red strip, the right wall with a green one, the couch along its length with an orange one, and the table legs with—one or more positioned above each other—yellow tiles cylindrically wrapped around the table legs (or even colors that match or are not/less visually disturbing with the colors of the objects the optically identifiable elements are applied to). Note also, that in a dynamically learning system, only a few such optically identifiable elements may lead to a very universally usable system. If the user currently present in the room occludes e.g. the red strip, the system can measure the optical properties of the black shoes currently covering it (average luminance, variation pattern, possibly spectral properties, etc.). It can then use these identifying parameters to apply the same optical occlusion detection for tracking events occluding even regions which do not have an optically identifiable element applied, such as when the user walks past a blue cat basket currently covering the green strip on the opposite wall. Specifically, the system may identify the pixels on a line in the image corresponding to the optically identifiable element 103 which however do not have the optical characteristics of the optically identifiable element. As the ground floor and the wall of a room may have a similar color as the shoes of a person, the use of the optically identifiable element provides a more reliable detection and its position ensures that an object which touches the ground and extends in height above the tape height is at least detected. When an object such as a human foot is placed between the camera 101 and the optically identifiable element 103, the optically identifiable element will become invisible at that particular position in the image. Since both the camera 101 and the optically identifiable element 103 are placed close to the ground surface and the optically identifiable element 103 is a thin strip of a few cm, an object of limited height (e.g. 5 cm) will already occlude the entire height of the optically identifiable element 103.

Figure 4:
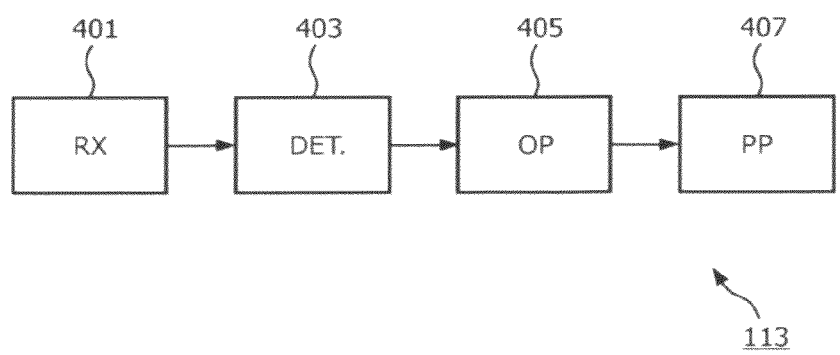
FIG. 4 illustrates an example of some elements of a processing device for determination of a depth position in accordance with some embodiments of the invention.

FIG. 4 illustrates an example of some elements of the processing device 113. The processing device 113 comprises a receiver 401 which interfaces the processing device 113 to the camera 101 and which specifically receives the video images from the camera 101.

The receiver 401 is coupled to a detector 403 which is arranged to detect the optically identifiable element 103 in the images in response to the optical property.

The detector 403 is specifically arranged to determine a geometric area in the image which corresponds to the optically identifiable element 103. The detector 403 may specifically determine the geometric area by finding a matching image area having a predetermined shape. For example, in the example where the optically identifiable element 103 is a narrow strip (tape) this will correspond to a line in the image. Thus, the detector 403 may try to find a line in the image which has characteristics that match those of the optically identifiable element 103. It will be appreciated that in other embodiments, other geometric shapes may be used. For example, if the optically identifiable element is a square, the detector 403 will proceed to match the image areas to a square having optical characteristics that match the optical property of the optically identifiable element 103.

In some embodiments, the predetermined geometric shape may take into account any deformation of the optically identifiable element 103 that may occur in the image, e.g. as a consequence of the placement of the camera 101 relative to the optically identifiable element 103 or e.g. due to varying distance between the camera 101 and the optically identifiable element 103.

The detector 103 may specifically search the image for an image area that has image characteristics that match the optical property of the optically identifiable element 103. For example, if the optically identifiable element 103 is bright red, the detector 403 will proceed to search for a suitable shaped geometric area in the image that is bright red, i.e. have pixel values representing a colour sufficiently close to bright red. Thus, the detector 403 will find the geometric area based on the image characteristics, and specifically the pixel values, matching that which corresponds to the optical property.

The detector 403 may specifically determine the image area corresponding to the optically identifiable element 103 in a situation where there already are occlusions that correspond to static objects. For example, a calibration operation may be performed without people but with chairs and tables obscuring the view of the optically identifiable element 103 from the camera 101.

As a specific example, the setup of FIG. 1 may be considered. In this example, the camera 101 is mounted at the bottom of a wall and pointed parallel to the ground surface in the positive z-direction looking at the reflective tape (the optically identifiable element 103) on an opposite wall. Since the tape properties (bright colour and/or reflectivity) are known and differ most of the time from the colour of a person's shoes or socks (typically dark brown or blue), the presence of human feet is easily detected by finding pixels on a line that corresponds to that of the reflective tape but which do not have the optical properties of the tape.

In this example, the camera 101 is mounted such that the optical axis (the z-axis) is perpendicular to the wall and parallel to the floor (assuming a 90 degree angle between the floor and wall). In theory the tape will therefore in the image from the camera 101 appear as a horizontal visible band slightly below the middle of the image. However, since the camera installation may vary in different implementations, the visible band may appear to be slightly displaced vertically and may also be rotated due to an unintended tilt in the mounting of the camera 101. However, it is known that an ideal perspective camera projects a straight line in the real world onto a straight line in the two dimensional image. Using this knowledge, the detector 403 may proceed to identify pixels that belong to the reflective tape by finding pixels of a band or line with a suitable width that has properties matching the optical characteristics of the reflective tape.

As a first step, the pixels belonging to the tape may be identified in the observed RGB-colour image based on the condition:

$$(r(u,v),g(u,v),b(u,v)) \in S,$$

where S is the set of values of the RGB-colour vector a pixel can take to classify it as a 'tape-pixel'. In the specific example where a saturated red tape was used, suitable values may e.g. be S={(119 . . . 255), (0 . . . 99), (0 . . . 99)}. Thus, pixels having RGB values within these ranges are assumed to correspond to the reflective tape. The choice of S of course depends on the colour of the tape used in the specific example. Furthermore, the set S may also depend on the settings of the specific camera that is used.

Having identified the possible pixels for the tape, a line fit is performed for these pixels. Specifically, a straight line is fitted through these pixels using e.g. the well known least-squares fitting method. As a result, a straight line is identified in the image with the equation:

$$u = av + b,$$

where u is the vertical axis and v is the horizontal axis of the image. In the example, the line corresponding to the reflective tape (i.e. the optically identifiable element 103) may be considered to have a single pixel width but in other embodiments a width of multiple pixels may be considered.

Thus, in this way the detector 403 identifies an area of the image which corresponds to the optically identifiable element 103 and which is thus assumed to have a pixel value corresponding to the optical property, such as e.g. simply the colour value of the optically identifiable element 103, in the absence of any objects obscuring the view of the optically identifiable element 103 from the camera 101. However, if any object is placed between the camera 101 and the optically identifiable element 103 these pixels will change value to that of the obscuring object.

The detector 403 is coupled to an occlusion processor 405 which is arranged to determine an occlusion property for at least one occlusion of the optically identifiable element 103 in the image in response to the optical property. Specifically, the occlusion processor 405 is arranged to identify occluded segments of the identified geometric area that correspond to the optically identifiable element 103 but which has a different optical characteristic than the optical property.

For example, the occlusion processor 405 may for each pixel in the image area corresponding to the optically identifiable element 103 determine whether the pixel value meets a match criterion relative to the optical property (for example that the colour does not differ by more than a given amount from that of the colour of the optically identifiable element 103). It may then continue to segment the image area into segments that are considered to correspond to the optically identifiable element 103 (i.e. predominantly containing pixels for which the match criterion is met) and segments that do not (i.e. predominantly containing pixels for which the match criterion is not met).

Thus, the occlusion processor 405 may be arranged to identify segments of the image area which should have the colour of the reflective tape but which do not match this colour. Such segment(s) will typically have a different colour because they have been occluded by an object located between the camera 101 and the optically identifiable element 103. The occlusion processor 405 may for example generate the occlusion property to include an indication of the size and/or position of all the occlusion segments that have been detected. The size and position values may specifically be given in pixel dimensions and may be provided in image coordinates. The values for a single pixel line may e.g. be given as a mid position and size, or as an indication of a start and stop coordinate.

Figure 5:
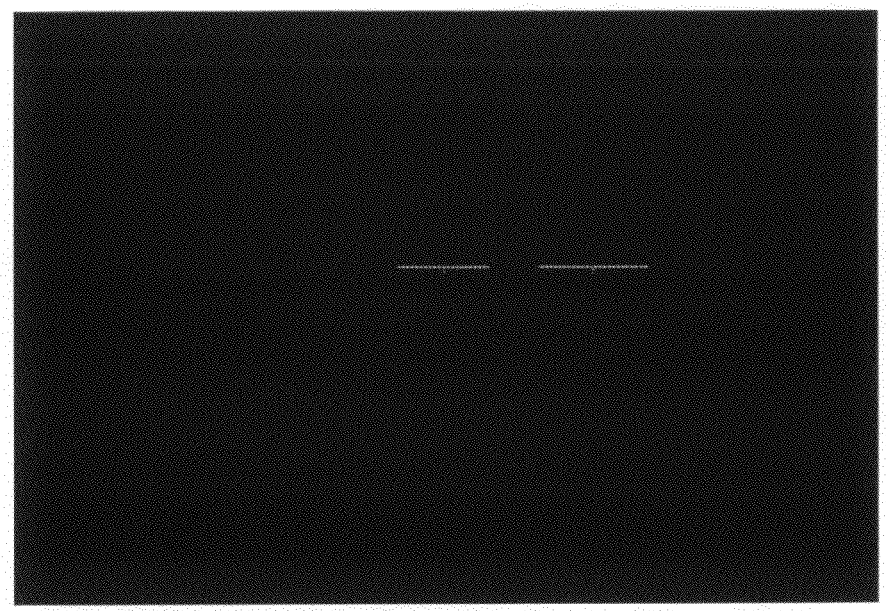
FIGS. 5 and 6 illustrate an example of a detection of occluded segments in the image of FIG. 3.
Figure 6:
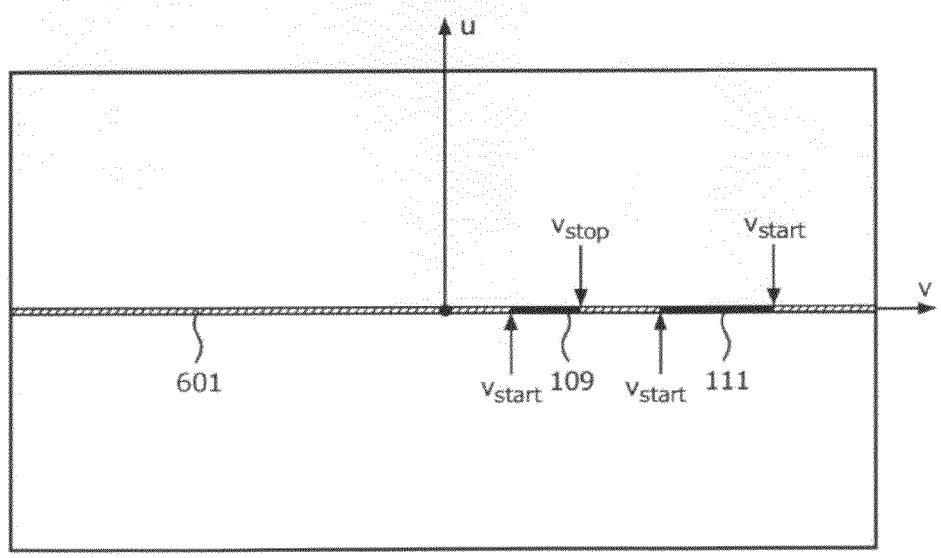

As a specific example, FIG. 5 illustrates the detected occluding segments in the image of FIG. 3 corresponding to the scenario of FIG. 1 (assuming the table and chair legs are not present). FIG. 6 illustrates the same image in a schematic form. In this example, the horizontal direction of the image is represented by the v-axis and the vertical direction of the image is represented by the u-axis. As illustrated, the optically identifiable element 103 is identified to correspond to a line 601 in the image and the occlusion processor 405 searches through the pixels of this line to identify the two occluded segments 109, 111 that have different colours than the optically identifiable element 103.

Specifically, the occlusion processor 405 may sequentially evaluate all pixels in the "tape" line 601 starting from the smallest v-coordinate and finishing with the largest v-coordinate. For each pixel (u,v) on the line a new occluded segment is started if:

$$(r(u,v),g(u,v),b(u,v)) \notin S$$

The occluded segment is considered to end when:

$$(r(u,v),g(u,v),b(u,v)) \in S.$$

Thus, in the example the begin and end positions ($v_{start}$, $v_{stop}$) for each occluded segment are determined. It will be appreciated that in many practical embodiments some implicit or explicit spatial filtering effect may be applied in order to compensate for image noise etc and to provide better defined segments.

The occlusion property, and specifically the indication of occluded segments, is fed to a position processor 407 which is coupled to the occlusion processor 405. The position processor 407 is arranged to determine a depth position for an object in the detection area in response to the occlusion property.

The depth position comprises at least one position component which is indicative of a position of the object along an axis from the optically identifiable element 103 to the camera 101 (and thus along the optical axis). The depth position thus comprises at least one component which is not in the image plane (i.e. in the x,y direction) but is along the optical axis of the camera (i.e. the z direction). Thus, the position processor 407 does not (just) estimate a position in the image but also (or rather) estimates a position in a direction perpendicular to the image. This estimate is generated on the basis of the information in the image and is specifically generated based on the occlusions of the optically identifiable element 103.

The inventors have specifically realized that the occlusion of the optically identifiable element may be used to determine not only the position of an object in the image plane but can also provide information that enables a determination of positions along the optical axis of the camera 101. As will be described in the following, different algorithms may be used to determine such a position estimate. In particular, the identification of occluded segments can be used and the position processor 407 may specifically determine the position estimate in the direction based on a position and/or size of an occluded segment of the optically identifiable element 103.

As a simple example, the position may be based on an estimated size of an occlusion together with an assumed size of the object. For example, an average size may be assumed for a person's feet and the position along the z-axis may be determined based on the measured size of the corresponding occlusion segment. Thus, a large occlusion segment is likely to result from a position close to the camera 101, and a smaller occlusions segment is likely to result from a position further remote from the camera 101.

It will be appreciated that although such an approach may provide some uncertainty in the estimated position for objects that may have different sizes (such as a peoples feet), this may be acceptable in many applications. Also, the approach may be particularly suitable for applications wherein the objects tend to be of the same size.

Figure 7:
FIG. 7 is an illustration of an example of an image captured by a camera of the system of FIG. 1.
Figure 8:
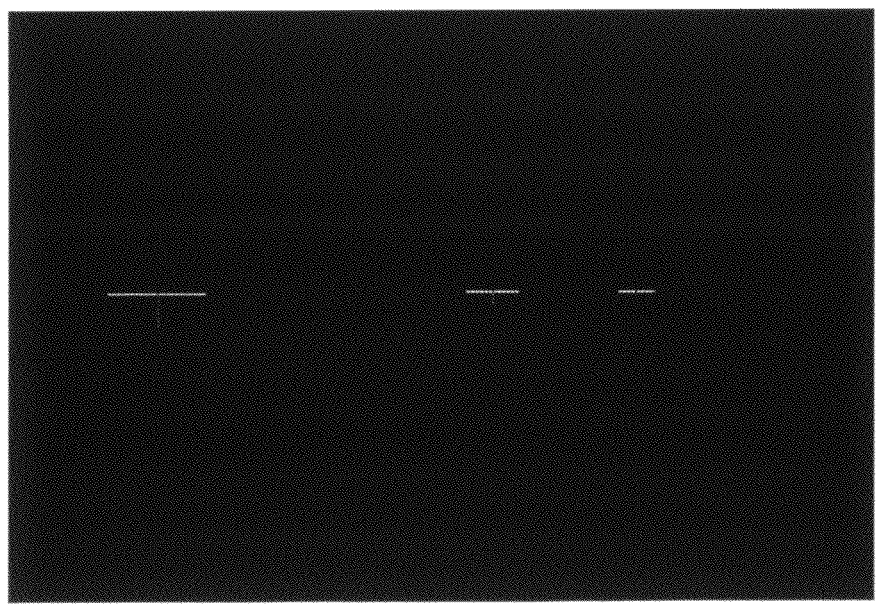
FIG. 8 illustrates an example of a detection of occluded segments in the image of FIG. 7.

For example, FIG. 7 illustrates an example wherein three plastic cups are positioned on the floor at different distances to the camera. The three plastic cups have substantially the same size at the point where they occlude the reflective tape. However, as illustrated in FIG. 8, the corresponding occlusion segments vary substantially in size due to their varying proximity to the camera 101. Accordingly, the size of the occluded segments may directly be used as an indication of the distance from the camera 101 to the cup, i.e. as an indication of the position along the z-axis.

However, in many examples, the position estimate is determined without any assumptions of the object size. Indeed, the position may in many embodiments be estimated and then used to estimate the size of the object.

In the following, an example is provided of the determination of the position estimate along the optical axis. In the example, the estimate is determined on the basis of an image object which is detected in the image to correspond to an occluded segment. Specifically, the position processor 407 may perform image segmentation and select one or more image segments that overlap or include the occluded segment. The image object or segment that corresponds to a given occluded segment may for example be determined as an area comprising pixels which have characteristics that meet a match criterion relative to the pixels of the occluded segment. For example, an area of pixels having substantially the same color may be used.

The position processor 407 then proceeds to determine the position estimate based on a characteristic of the image segment. This image characteristic may for example be a size or a dimension of the image segment. Indeed, in the specific example, the image characteristic may be indicative of an extension of the image object in an image direction away from the optically identifiable element. The image direction may e.g. correspond to a vertical image direction and/or a direction along the floor of the room.

The image property/characteristic may be indicative of an extension of the image object in a substantially vertical image direction. Thus, the extension of the image object in the downwards direction may be measured and used to determine the position of the object along the z-axis. As illustrated in FIG. 7, the paper cups that are closest to the camera also extend further downwards in the image than those further away.

As a specific example, the position processor 407 may first proceed to determine the image position coordinate in the direction along the tape (the optically identifiable element 103), i.e. in the y-direction. This direction corresponds to the v-coordinate in the image and may simply be determined as the mean position:

$$v_{obj} = \frac{v_{start} + v_{stop}}{2}.$$

This provides a position of the object in the image, but not yet a position on the floor. In order to calculate the position of an object on the floor, the position processor 407 proceeds to calculate first the z-coordinate and then the y-coordinate.

Figure 9:
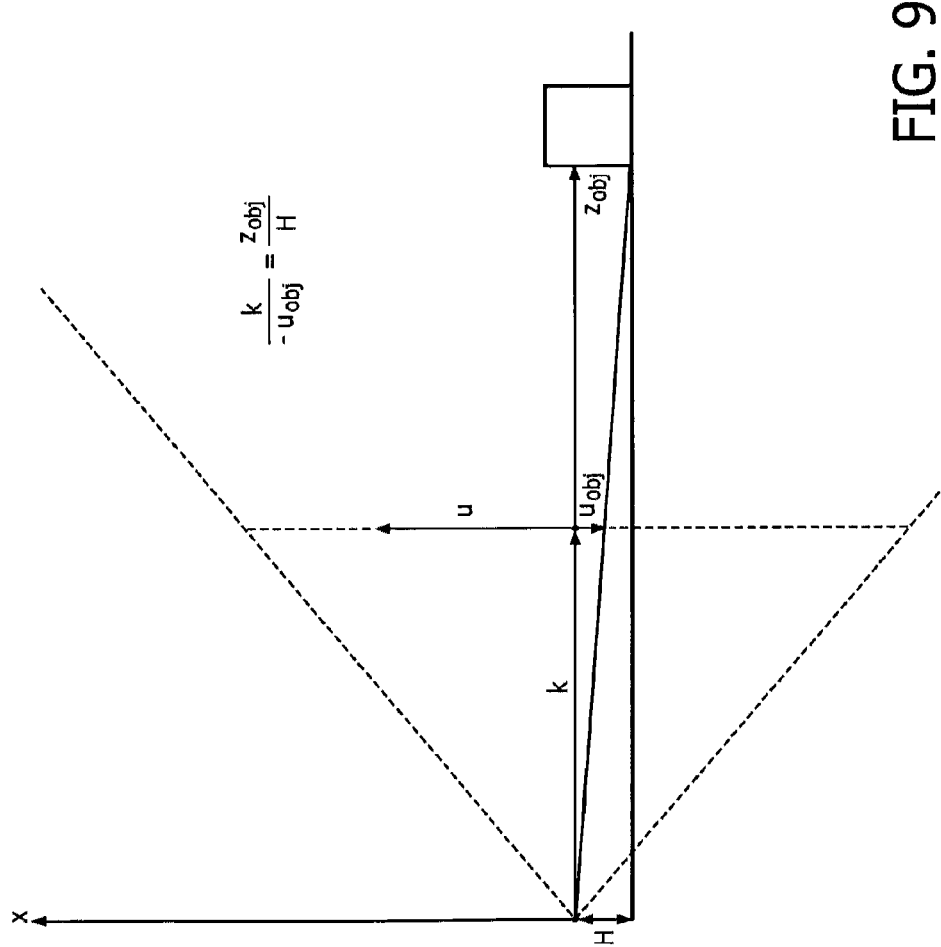
FIG. 9 illustrates an example of a geometry associated with the setup of FIG. 1.

FIG. 9 illustrates a diagrammatic view of the geometry to resolve. The approach is based on an assumption of the camera corresponding to a 'pinhole camera model' and perspective projection equations as for instance given in D. A. Forsyth and J. Ponce. 2003. "Computer Vision: A Modern Approach". Pearson Education, Inc. ISBN 0-13-191193-7.

The position processor 407 seeks to determine the z-coordinate of the point where the object touches the floor. In order to determine this, the vertical image coordinate (the u-coordinate) of this point is first determined. The position processor 407 does this by determining a segment border in the image between the image region where the object is mapped and the image region that does not image the object but still the floor.

Figure 10:
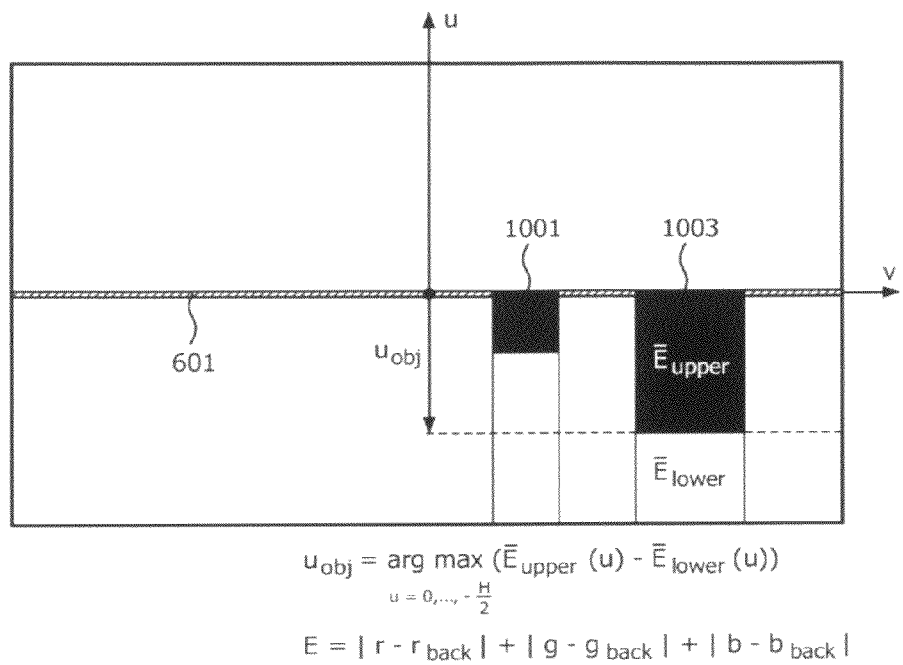
FIG. 10 illustrates a schematic example of an image captured by a camera of the system of FIG. 1.

FIG. 10 illustrates an example wherein only two objects are present in the image (corresponding to the example of FIG. 6). The two objects result in two image objects or segments 1001, 1003 which correspond to the occluded segments (only the parts below the optically identifiable element 103 are considered). These image objects 1001, 1003 extend below the line 601 corresponding to the optically identifiable element 103.

First, this vertical image 'bar' below the line 601 is evaluated to determine which part of a background image has changed due to the presence of the object. The specific approach of the example does not assume that the background has a specific colour but assumes that some contrast in colour exist between the object and the background. Since object detection was already performed base on the optically identifiable element, the amount of contrast between object and background has only effect on the position estimate and not on the object detection step. Also, the presence of the optically identifiable element makes the position estimation more robust since it reduces it from a two dimensional to a one dimensional search problem. Since the object's image typically contains multiple image columns (extends in the image v-direction), an averaging operation can be applied when the difference with the pre-computed background image is evaluated. This compensates for the possibly small contrast between the object's image and the background image.

The difference between the mean error of the upper bar minus the mean error of the lower bar is thus determined for all possible positions of the transition (the border). The border is then selected to correspond to the position for which a maximum difference is found. The u-coordinate that corresponds to the maximum difference between the two mean errors is accordingly selected as the u-coordinate for the object. Thus the u-coordinate represents an image distance between the line 601 corresponding to the optically identifiable element 103 and the segment border for the segment 1001, 1003 that corresponds to the occlusion 109, 111.

Given the object's u-coordinate, the position processor 407 then proceeds to calculate the object's z-coordinate based on the geometry illustrated in FIG. 9 which results in the following equation:

$$\frac{z_{obj}}{H} = \frac{k}{-u_{obj}},$$

where k is a fixed constant that depends only on camera parameters (see D. A. Forsyth and J. Ponce. 2003. "Computer Vision: A Modern Approach". Pearson Education, Inc. ISBN 0-13-191193-7, Chapter 2 titled 'Geometric Camera Models' for background), and H is the height of the camera above the ground. The equation follows automatically from the geometry of FIG. 9 since it basically corresponds to a requirement that the triangles from the camera to $u_{obj}$ and $z_{obj}$ respectively are similar (have the same geometric proportions apart from size).

The camera dependent parameter k may be known from the specifications of the camera. However the value of k may not be strictly needed. Indeed, as can be seen from FIG. 9 and the equation above:

$$u_{obj}z_{obj} = -kH$$

Since −kH is a constant, so is accordingly $u_{obj}z_{obj}$.

This makes it possible to calibrate the system once the camera and the optically identifiable element have been installed. An object may be positioned in the detection zone a known distance $z_{ref}$ (e.g. 1 m) to the camera 101 and the corresponding u-coordinate $u_{ref}$ may be measured. For a different object with a different u-coordinate, the corresponding z-coordinate may be determined as:

$$z_{obj} = \frac{z_{ref} u_{ref}}{-u_{obj}}.$$

where the 'ref' index refers to the values obtained for the calibration object.

Figure 11:
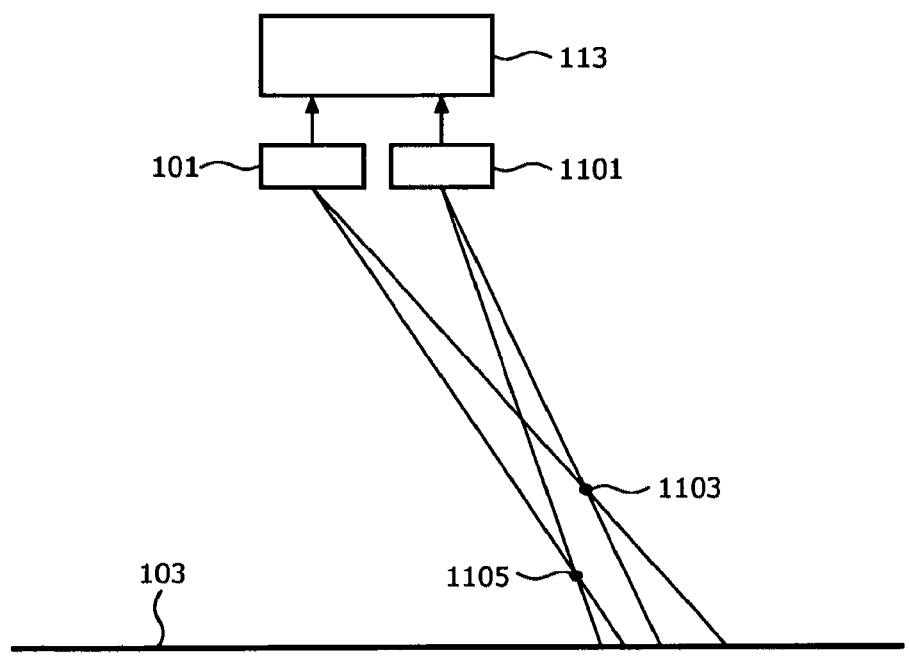
FIG. 11 is an illustration of a system for determination of a depth position in accordance with some embodiments of the invention.

In the following, a different example of determining the position along the z-axis from the occlusion of the optically identifiable element 103 will be described. The specific example uses a second camera 1101 which is also coupled to the processing device 113 as illustrated in FIG. 11. The second camera 1101 may be located at the same relative height as the first camera 101 but may be displaced in the y-direction. In many embodiments a relatively short distance between the cameras 101, 1101 may be used, such as e.g. no more than 50 cm or even 20 cm.

In the example, the detector 403 is arranged to perform the same processing on the images from the second camera 1101 as from the first camera 101. Thus, specifically, the detector 403 may identify an area (specifically a line) in the image which corresponds to the optically identifiable element 103. Similarly, the occlusion processor 405 proceeds to perform the same processing and determine an occlusion property which specifically may identify sections of the image area corresponding to the optically identifiable element 103 which are occluded by intermediate objects. The identified occluded segments are fed to the position processor 407.

Due to the different placement of the cameras 101, 1101, the relative displacement on the optically identifiable element 103 of an object located in the detection area will depend on how close the object is to the cameras 101, 1101. This is illustrated in FIG. 11 wherein two object points 1103, 1105 are illustrated (the object points may e.g. be considered to be points on the objects of 105, 107 of FIG. 1 or may e.g. be considered to correspond to very narrow objects). Due to the displacement of the cameras 101, 1101, the objects 1103, 1105 will be displaced in the image and will occur at different positions in the image. Also, due to the displacement of the cameras 101, 1101, the objects 1103, 1105 will occur at different positions relative to the optically identifiable element 103. Furthermore, the actual displacement of the objects 1103, 1105 in the image and relative to the optically identifiable element 103 depends on the distance of the object along the z-axis. Indeed the displacement increases for a decreasing distance from the cameras 101, 1101 to the object.

Thus, in this embodiment, the position processor 407 is arranged to identify occluded segments in the two images which correspond to the same object. This may for example be done by matching the occluded segments that are closest to each other, although it will be appreciated that more complex algorithms e.g. considering sizes and/or the geometries of the setup may be used. For the matching segments, the displacement of a point in the two images may be determined (either in the image as such or relative to the optically identifiable element 103). For example, the displacement of the calculated mean position may be determined. This displacement may then be used to calculate the position in the z-direction. Thus, the position estimate is calculated based on the difference in the relative image positions between occluded segments in the two images.

Figure 12:
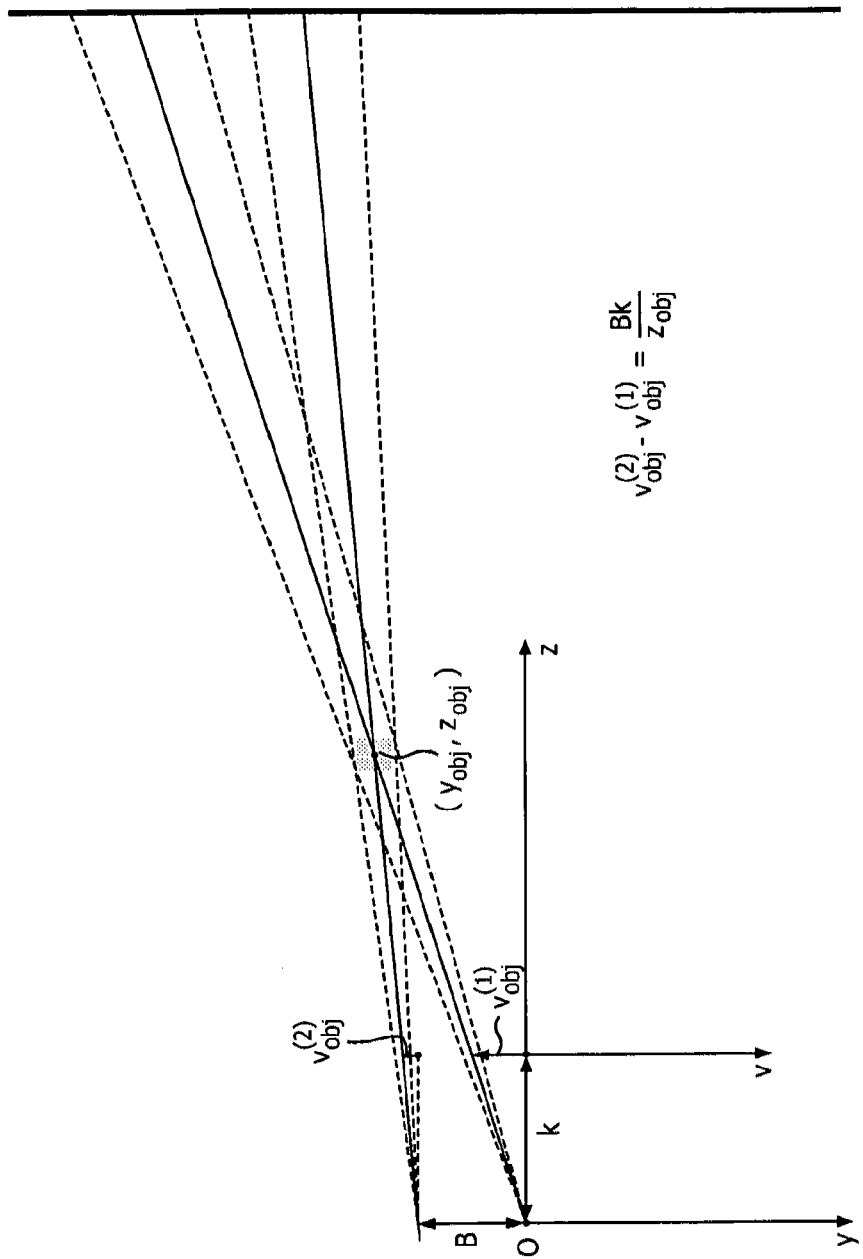
FIG. 12 illustrates an example of a geometry associated with the setup of FIG. 1 but employing two cameras.

For example, referring to FIG. 12, the position in the z-direction may be calculated from the displacement using the following equations. Let us assume that the second camera is placed at a distance B along the y-axis in the negative y-direction relative to the first camera. Using the pinhole camera model we have for the first camera:

$$v_{obj}^{(1)} = \frac{k y_{obj}}{z_{obj}}.$$

Since the second camera is displaced we have:

$$v_{obj}^{(2)} = \frac{k(y_{obj} + B)}{z_{obj}}.$$

Note that $y_{obj}$ and $z_{obj}$ are specified in the original first camera coordinate system. The depth estimate for the stereo case follows from the two previous equations as $$z_{obj} = \frac{Bk}{v_{obj}^{(2)} - v_{obj}^{(1)}},$$

The above equation assumes that the separation B is only along the y-axis. The baseline B is typically known before installation. However, B, could also be calibrated by placing an object at a known z-coordinate and measuring the displacement in the v-coordinates.

Figure 13:
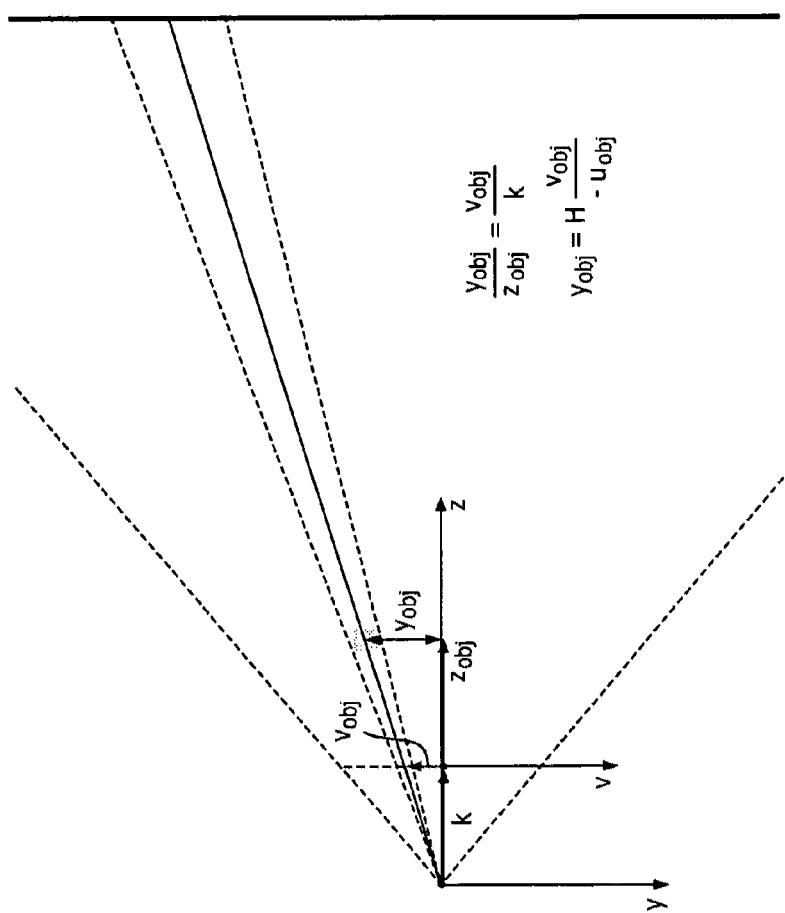
FIG. 13 illustrates an example of a geometry associated with the setup of FIG. 1.

In some embodiments, the position processor 407 may further be arranged to determine a two-dimensional position of the object on the floor. For example, following the determination of the z-coordinate, the position processor 407 may proceed to determine the y-coordinate. This may be done based on the geometry illustrated in FIG. 13

The y-coordinate may be calculated based on the equation:

$$y_{obj} = \frac{z_{obj} v_{obj}}{k}$$

i.e. based on the assumption that the ratio between the y and z coordinates (i.e. the distance from the camera 101 to the object along the y-axis and z-axis respectively is the same as the ratio between the v-coordinate and the camera factor k. See the geometry in FIG. 13. In the stereo camera case, the above equation can be used thereby assuming the knowledge of parameter k.

For the single camera case, the equation for the y-coordinate can be further simplified. The parameter k is no longer needed and the y-coordinate follows from the u-coordinate of the object:

$$y_{obj} = H \frac{v_{obj}}{-u_{obj}}$$

The height H of the camera may e.g. be measured and manually input to the position processor 407 by a user.

Figure 14:
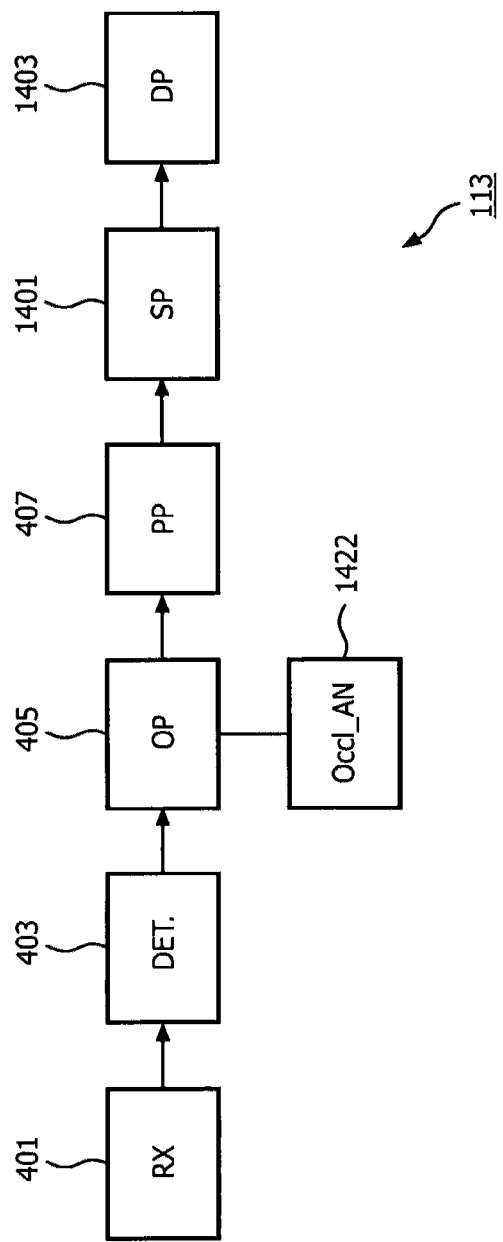
FIG. 14 illustrates an example of some elements of a processing device for determination of a depth position in accordance with some embodiments of the invention.

In some embodiments, the processing device 113 may, as illustrated in FIG. 14, further comprise a size processor 1401 which is arranged to determine a size estimate for the object in response to the depth position and an image size of at least one occluded image segment of the optically identifiable element. In particular, the z-coordinate may be used to determine a size estimate for the corresponding object.

As an example, the size processor 1401 may be fed the z-coordinate and an image size of the corresponding occlusion segment. For example, the start and stop coordinates of the occlusion segment on the optically identifiable element 103 may be provided to the size processor 1401.

As a specific example, the size of an object may be calculated as in the single camera case as:

$$\Delta_{obj} = H \left| \frac{v_{obj}^{start} - v_{obj}^{stop}}{-u_{obj}} \right|.$$

For the stereo camera case, the size of the object can be estimated from the start and stop v-coordinates of the image object in the first camera:

$$\Delta_{obj} = \frac{z_{obj}}{k} |v_{obj}^{start} - v_{obj}^{stop}|.$$

The system may provide particularly advantageous detection of the presence of creatures (such as pets or people) in a room. Indeed, the system may be particularly advantageous for detecting objects that are dynamic, moving and for which little information is known in advance. In the example of FIG. 14, the processing device 113 further comprises a detection processor 1403 which is arranged to detect the presence of a creature in the detection area. Once the occlusions are detected roughly, they may be analyzed more in detail by an occlusion analysis unit 1422, e.g. it may extract color model or texture model parameters, geometrical parameters, etc. for the occluded region and or the occluding object. This may aid in determining where occlusion occurs, what the properties are of the occluding object (the black shoes of the father of the house, the red pumps of his wife, or the pink shoes of the daughter of the neighbors they look after or play a game with), how they will change with illumination (by multiplying the extracted spectrum with the current illumination), etc.

In the example, the detection processor 1403 is arranged to detect the presence of the creature in response to a dynamic variation of an occlusion of the optically identifiable element 103 in the image. Thus, the detection is not only based on the presence of an occlusion but also dependent on a dynamic (temporally changing) characteristic of the occlusion.

In some embodiments, the dynamic variation may comprise a variation in the position of an occluded segment of the optically identifiable element 103. For example, the detection processor 1403 may proceed to detect that a creature has entered the room if a new occlusion segment has been detected which furthermore moves such that the position (or the size) changes. This will prevent that e.g. a chair being positioned in the detection area will be detected as a person entering the room. As another example, the detection processor 1403 may detect the presence of a person only if the occlusion segment is temporary i.e. if it is only present (without moving) for less than a given amount of time.

Thus, the detection processor 1403 may detect that a creature is present if an occlusion is detected which has a temporal characteristic that meets a criterion.

In the system of FIG. 14, the detection processor 1403 may further be arranged to determine a characteristic of the creature or of an activity of the creature in response to the dynamic variation of one or more occlusions. For example, a movement characteristic may be determined in response to the dynamic variation. One can construct several applications with this information, e.g. a dancing game can test whether the player has accurately reproduced the proposed dance. Or, in a virtual football game the temporal pattern of the occlusion (e.g. movement speed and direction) can be used to physically model the shooting path of a virtual ball.

For example, the movement of an occlusion along the optically identifiable element may be determined as a speed of movement of a foot of a person in the room and the associated walking speed may be estimated.

In some embodiments, the detection processor 1403 may be arranged to group temporally separated occlusions and to determine the characteristic in response to a characteristic of the occlusions. For example, two temporally separated occlusion segments may be grouped together and the characteristic may be determined in response to at least one of a position and a timing of the occlusions.

As a specific example, a first temporary occlusion segment may be detected and assumed to correspond to a foot. When the temporary occlusion segment disappears, the detection processor 1403 may search for a new occlusion segment of a comparable size occurring within a given time interval and within a given position interval. If such a second occlusion segment is detected, the detection processor 1403 assumes that the events have occurred due to a walking person moving his foot as part of taking a step. The distance between the occlusions may then be used to determine the gait of the walking person and the timing of the occlusions may be used to further calculate a walking speed for the person.

It will be appreciated that this example may be extended to a determination of more than two temporally divided occlusion segments. Indeed, the approach may be used with multiple cameras such that the different occlusions are detected by different cameras. For example, a series of cameras may be arranged along one wall of a corridor with a reflective strip being placed on the opposite wall.

In the previous examples, it has been assumed that no other objects occur in the detection area. However, a particular advantage of the described approach is that it is very useful for environments for which it is unknown which objects are indeed present. Specifically, the system can easily be arranged to automatically or semi-automatically compensate for the presence of other objects.

In some embodiments, the processor device 113 may be arranged to determine a set of nominal occluded segments of the optically identifiable element in the room. Such nominal occluded segments are considered to correspond to (semi) static objects in the room and thus do not correspond to the object(s) of interest. Accordingly, the position processor 407 is arranged to compensate the occlusion property for the nominal occluded segments. As a simple example of a compensation, any nominal occluded segment may simply be ignored in the further processing (and e.g. the segments may be considered to have the same colour as the optically identifiable element 103).

In some embodiments, the set of nominal occluded segments may be determined as occluded segments of the optically identifiable element in a calibration image. The calibration image may be captured at a time where no objects to be detected or characterized are present in the detection area. For example, when the system has been setup, the user may indicate to the processing device 113 that the detection area is now clear except for static objects. The processing device 113 may then evaluate the image and detect any occluded segments of the optically identifiable element 103. These occluded segments are then designated as nominal occluded segments and are ignored in the subsequent detection/processing.

In some embodiments, a more dynamic and automated designation of nominal occluded segments is performed. In particular, an occluded segment of the optically identifiable element may be designated as a nominal occluded segment if a duration of the occlusion exceeds a threshold. The threshold may for example be a fixed threshold such as 20 seconds. This will ensure that (semi)static objects will automatically be detected and ignored in the occlusion processing thereby limiting the processing to newly occluded segments. Hence an automatic and continuous calibration can be achieved.

This may for example be particularly advantageous in an application for detection of a person in the room where the presence of e.g. furniture (tables, chairs) is not of interest. Typically a person will move around the room and be more dynamic than for instance a chair. To detect the presence of a person, the detection criterion for each pixel (u,v) belonging to an occluded segment may for example be modified to also require that the occlusion of the pixel must have been shorter than a given time interval:

$$(r(u,v), g(u,v), b(u,v)) \notin S,$$

$$\tau(u,v) < T_{max}.$$

The second condition implies that if a pixel is outside the requirements for being considered to represent the optically identifiable element 103 for longer than $T_{max}$, then the pixel is interpreted as being part of a stationary object and is excluded from the detection, i.e. the pixel is considered to belong to a nominal occluded segment. As soon as the pixel once again belongs to S (i.e. it is no longer occluded), then the timer $\tau$ is reset to zero. This means that if a chair is moved, it may at first be detected as a human but as soon as it has stopped moving for more than $T_{max}$, it is again ignored in the processing. In practice, there may be furniture in the detection area already at initialization of the system and the above approach will ensure that after $T_{max}$ seconds (plus typically some extra initialization time), the system will be initialized.

In some embodiments, the system may also be dynamically updated to reflect different lighting conditions. For example, the background image consisting of the colours $r_{back}$, $g_{back}$ and $b_{back}$ may initialized at installation of the camera. Over the period of a day, lighting conditions will change and the background image may be updated accordingly. For systems that do not use an element with known optical characteristics this may be problematic since a 'missed object' will become a 'false background'. However, the presence of the optically identifiable element 103 with a known and distinguishable optical property makes it possible to update the background reliably.

It will be appreciated that the described system may be used for many and varied applications.

For example, the system may readily be used as a person presence detection and rough person localization in a room or corridor. The described method for determining a two dimensional position of an object on a floor may be applied to each foot of the person. In some embodiments, the number of occluded pixels (the distance along the line corresponding to the optically identifiable element) may be determined and normalized for the distance to the camera. If the number of (normalized) occluded pixels is above a given threshold (while ignoring all occluded pixels belonging to nominal occluded segments), the presence of a person may be detected.

Figure 15:
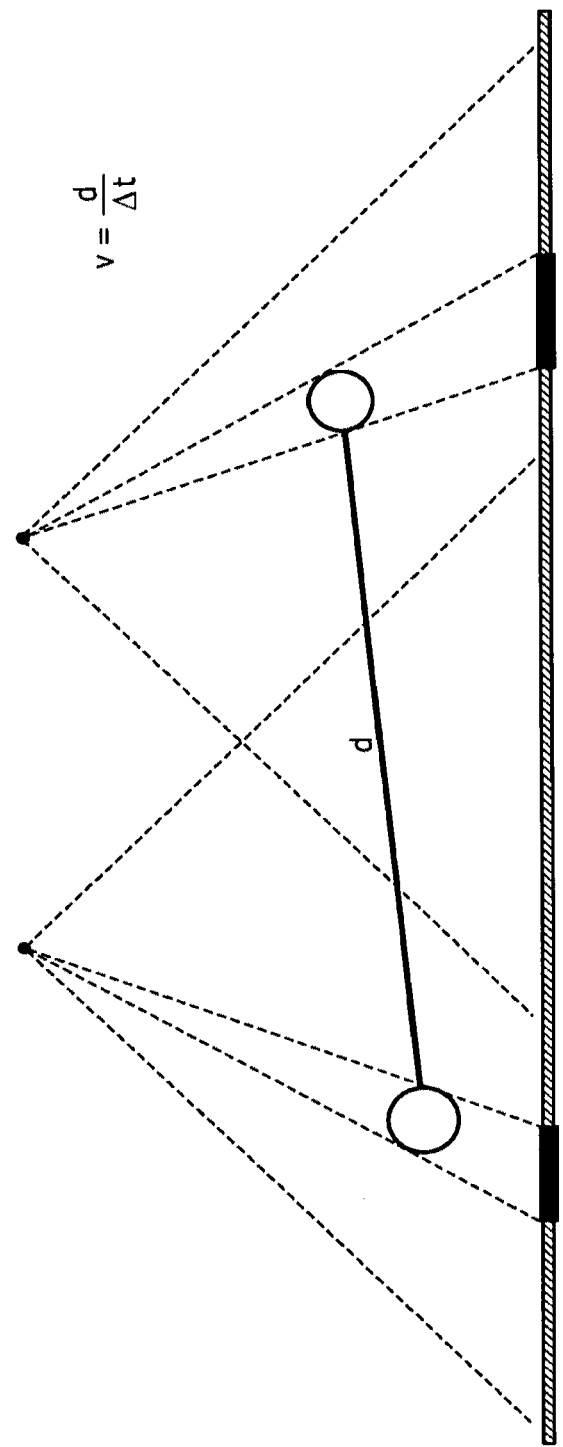
FIG. 15 is an illustration of a system for determination of a depth position in accordance with some embodiments of the invention.

Another exemplary application is the determination of walking speed of a person. For example, the duration of the presence of occlusions may be used to determine walking speed. E.g., as illustrated in FIG. 15, multiple cameras may be mounted along a corridor and the feet mapping method may be used for each camera to estimate a position of the feet of the person. This may then be converted into a walking speed estimate for the person. The typical walking pattern (how does the occluded shape change, e.g. a couple of linear cross section occlusions) may also be used to identify persons, e.g. in a game played in the room.

Another example is an estimation of a size of a person. Specifically, the size of a person's feet may be estimated from the estimated z-coordinate and the size of the corresponding occlusion segment.

Such characteristics may for example be used to provide a more advanced detection. For example, the determined characteristics may be used to differentiate between different people. This may e.g. be used to differentiate between children and adults or e.g. between known persons and possible intruders.

The system may for example be used as a part of a child protection or detection system which can automatically detect if a child is within or approaching an area that is prohibited for children. For example, an alarm could be triggered if a child approaches a dangerous area. Such a detection could be based on a detection of an occluded segment approaching an area of the optically identifiable element 103 associated with the dangerous area.

As another example the system may be arranged to detect a fall of a creature in response to the occlusion property being indicative of an occluded segment having a size exceeding a threshold. E.g. a person lying on the ground will typically cause a large object to appear in the scene which results in a large occluded segment. Thus a fall detection system for e.g. the elderly may be achieved by raising a fall alarm in case an object is detected which is larger than a given threshold. Of course, in such child or elderly supervision systems, our present system may form part of a totality, which may also e.g. have further cameras or other sensors studying what exactly happens in the quickly determined region of interest (e.g. send a picture to a supervisory unit, such as a parent unit display of a baby phone, or a dedicated monitoring station, e.g. with a monitor of an apartment building, or elderly home), audio such as cries may be analysed, etc.

As yet another example, the system may be used for a gaming application where the user's feet positions may be continuously and dynamically detected and used to control the game. For example, a dance game can be implemented where the person is free to move around the room and which allows mapping of the user's feet to the game. As another example, the movement of a ball or other game piece that touches the floor in the room can be detected and incorporated in the game.

In a soccer game, the system may be linked to a screen where a goal, the ball and a person's feet are displayed. The screen may be part of a TV set, glasses that are worn by the players of the game and/or a display that is packaged as part of the game. The visual feedback may use a stereoscopic (3D) display method. The ball on the screen may react to a person's feet when he or she hits the virtual ball. The direction the ball takes may depend on the person's feet movement before he or she virtually hits the ball. Feedback by means of sound or light may be provided as feedback to the players. The electronics to do this may be built inside the optically identifiable element and/or camera unit. The system could also be used to create a child playing area in a room, e.g. using a flexible cloth that is draped on the floor to form a circle, ellipse or any other shape. This flexible setup may also be taken outside and put on the lawn in the garden. The position of the child and/or toys could be transmitted for display on a smart phone.

As yet another example, the system may be used as part of a sports training device. For instance, a tennis ground may be surrounded with the optically identifiable element and the feet positions and orientations of tennis players can be recorded for later review. These position data may be combined with other camera data to make the system a useful training tool.

As yet another example, the system may be used to assess movement of people within a given area, such as a corridor. This may for example be useful for determining movement patterns in e.g. a museum (where it can be configured in a soft approach mode, reducing false alarms, and it can also analyse how the person approaches the artifact, e.g. whether he just slowly comes a little too close but stays there) or a factory.

In some embodiments, the presence of other objects in the detection area may be significant. In such embodiments, it may be advantageous to position a further optically identifiable element on one or more objects in the room where the further optically identifiable element has a further optical property. For example, the original optically identifiable element placed on the wall may be bright red and the element placed on objects (e.g. tables or chairs) may be bright yellow.

In such an embodiment the detector 403 may detect the further optically identifiable element in the image in response to the further optical property. The occlusion processor 405 may determine the occlusion property as an occlusion property for both the optically identifiable element and the further optically identifiable element in response to the optical property and the further optically identifiable element. For example, the occlusions of the red and the yellow sections may be combined into occluded segments corresponding to the same object. The determination of the coordinates may then proceed accordingly.

Figure 16:
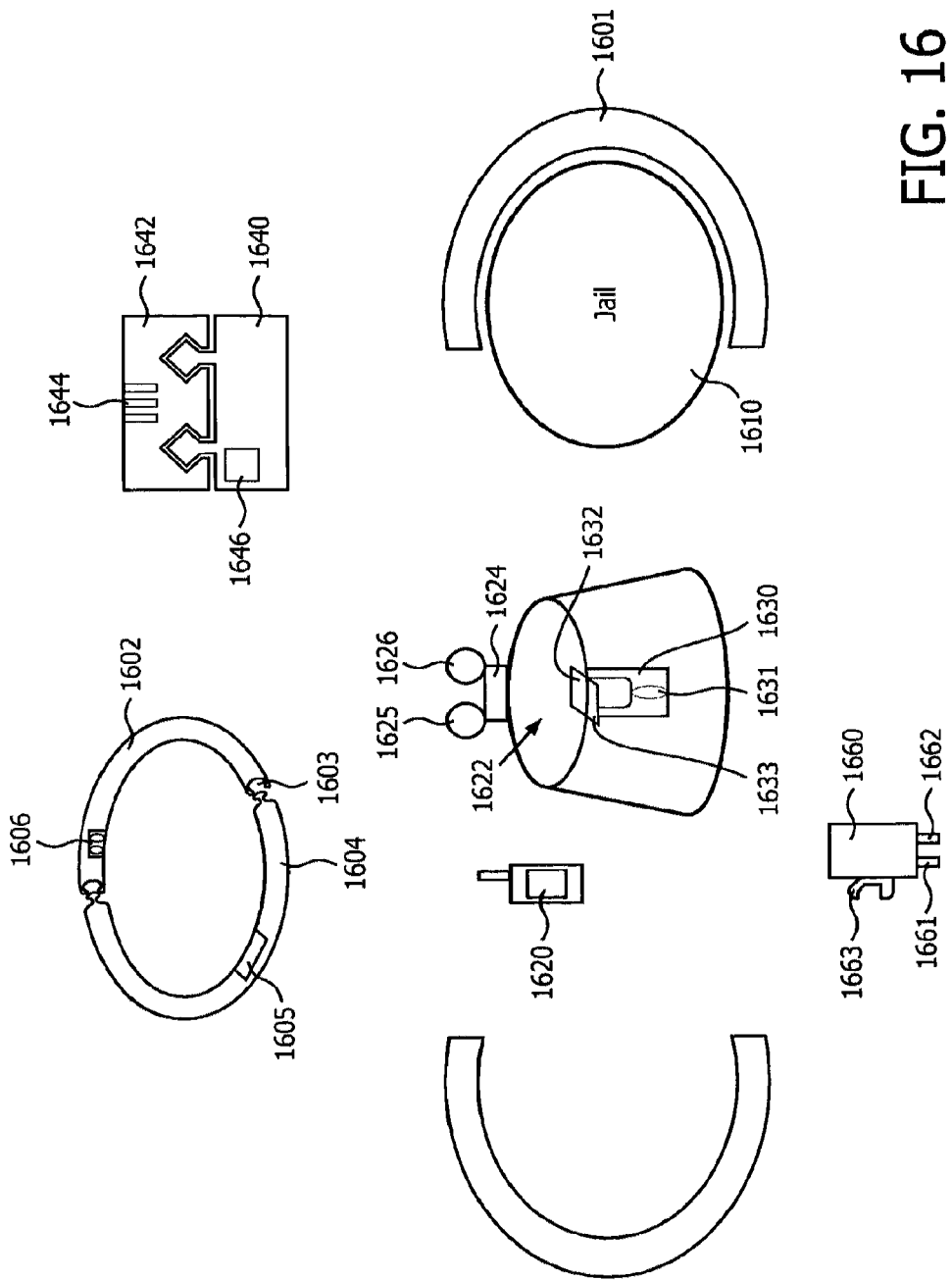
FIG. 16 schematically shows an exemplary gaming system one can build with several subcomponents enabling the present invention rationale.

FIG. 16 shows how one can make (e.g. separately sellable to upgrade) a virtual world in any room or e.g. at the beach or on a town square, such as e.g. a gaming board. The optically identifiable element may be separately sold as a flexible tube 1601, or it may even be a scarf. One can use it to demarcate a region, which may correspond to and be covered by an identification element 1610 e.g. a carpet element or unfoldable foil containing identification information of the region (such as the text "Jail" or demarcations of a game street like a pedestrian crossing, or picture elements like painted trees). One also may purchase a camera containing unit 1622, which may e.g. be a soft pod (allowing balls to be thrown on it). This may precomprise several cameras or dual camera sets (e.g. one for each 90 degree orthogonal quadrant). Here shown are a first camera 1625 and second camera 1626 fixedly connected to an outside connection 1624, but typically they may also be protected by being buried inside the pod. The pod also shows at least one slot 1630, in which at least one camera containing device 1620 (e.g. a mobile phone) may be placed. This may typically be a slot with soft compressible cushioning allowing several phone shapes to be accommodated. A protective soft lid 1632 protects the phone. A slit 1631 allows the camera to view outside (typically inserted upside down). The mobile phone may communicate (e.g. the data of its captured images) with other attached phones, whether another mobile camera containing apparatus in an adjacent slot, or even a camera device inserted in another optically identifiable element 1604 slot 1605, or another camera device positioned elsewhere. Typically such mobile apparatuses can also run an application encoding a game scenario, and may feedback data on their display (which can also be made visible by uncovering another protective lid 1633). One may also sell a jacket 1660 for such a mobile device, which has positioning elements 1661, 1662 such as feet or suction cups to put or fix it to the ground, and a connection device 1663 such as a clasp to attach a second mobile device, the first being inserted in the jacket (which may again be made of cushioning material, and the second one may also be in a cushioning jacket). This way one can easily deploy the required camera capturing hardware from two (or even a single) mobile phones of the users. 1604 and 1602 are two elements with connection means 1603 which can be used to demarcate areas (e.g. a field of a virtual game board, or virtual room etc.). One or more of them may already contain one or more cameras. Then if the region is closed, its inside events will not be seen by the main camera containing unit 1622 (which can be used to hide the player in a firing game), but it can be monitored by its own camera(s) 1606. Note that either the camera or the optically identifiable element may comprise communication means to communicate with other apparatuses, such as a personal computer. Optically identifying blocks 1640 and 1642 show two other examples of components which can be used to build a system, which are built of hard materials, and in this example stackable vertically. One of the hard blocks also contains a display 1646, usable for feeding back game information, but also for providing (potentially modifiable in time) optically identifiable markers. E.g., when a duck icon is shown on the block it may function as a water pool, but when it shows a skull the water is poisoned. The player may not notice this when he "jumps in the pool", but since the system will, he will loose points for jumping into poison. Also an exemplary multicolor pattern 1644 is shown. Whereas the tile may be yellow, these e.g. red, green and blue local colors may aid in identification of the game situation, e.g. the occlusion. It should be understood that by using such components, numerous applications can be constructed on the fly, not just as practical for games, but also for more serious applications such as area monitoring, industrial production, etc.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A system for determining a position characteristic for an object in a detection area of a space, the system comprising:
   an optically identifiable element having a width at least 10 times more than a height thereof, said optically identifiable element being positioned on a vertical surface proximal to a ground surface in the detection area by a largest distance from the ground surface of no more than 50 cm, the optically identifiable element having an optical property;
   a camera positioned across the detection area from the optically identifiable element, the camera capturing an image that comprises (i) the detection area and (ii) the optically identifiable element, wherein the image further comprises an image plane of pixels (u,v) extending in a horizontal direction and in a vertical direction, where u is a vertical axis and v is a horizontal axis;
   a detector for detecting the optically identifiable element in the image in response to the optical property;
   an occlusion processor for determining an occlusion property of at least one occlusion of the optically identifiable element in the image in response to the optical property, wherein the occlusion property includes at least one of an image position and an image size of an occluded segment of the optically identifiable element; and
   a position processor (i) for determining an image characteristic of an image object in the image associated with the occluded segment of the optically identifiable element, wherein the image characteristic is indicative of an extension of the image object in an image direction away from the optically identifiable element, (ii) for determining a segment border in the image between (ii)(a) an image region where the image object is mapped and (ii)(b) an image region where the image object touches a floor of the space in the image and (iii) for determining a depth position for the object in the detection area in response to (iii)(a) the occlusion property, further in response to (iii)(b) the image characteristic of the image object, and still further in response to (iii)(c) a u-coordinate for the image object that represents a vertical image distance between a line corresponding to the optically identifiable element and the segment border such that only a portion of an image object segment extending below the line is considered, and wherein the depth position is indicative of a position of the object along an optical axis of the camera.

2. The system of claim 1, wherein the space comprises a room.

3. The system of claim 1, wherein the optically identifiable element is an elongated element (i) applied to a wall or (ii) used to form an artificial boundary.

4. The system of claim 1, further comprising:
   a further camera positioned across the detection area from the optically identifiable element, the further camera capturing a further image that comprises (i) the detection area and (ii) the optically identifiable element, wherein the detector further detects the optically identifiable element in the further image in response to the optical property,
   the occlusion processor determines a further occlusion property of at least one occlusion of the optically identifiable element in the further image in response to the optical property, and
   the position processor determines the depth position further in response to both (i) the occlusion property and (ii) the further occlusion property.

5. The system of claim 4, wherein the position processor determines the depth position further in response to a difference in relative image positions between occluded segments in (i) the image and (ii) the further image.

6. The system of claim 1, further comprising:
   a size processor for determining a size estimate for the object in response to (i) the depth position and (ii) an image size of at least one occluded image segment of the optically identifiable element.

7. The system of claim 1, wherein the object comprises a human or non-human living creature, the system further comprising:
   a detection processor for detecting a presence of the living creature in the detection area in response to the occlusion property.

8. The system of claim 7, wherein the detection processor detects the presence further in response to a dynamic variation of an occlusion of the optically identifiable element in the image.

9. The system of claim 8, wherein the detection processor further determines a first characteristic of at least one of (i) the living creature and (ii) an activity of the living creature in response to the dynamic variation.

10. The system of claim 1, wherein the detector further estimates a geometric area of the image corresponding to the optically identifiable element in response to detections of image areas having an image property matching the optical property, and the occlusion processor further identifies occluded segments of the geometric area having an image property not matching the optical property.

11. The system of claim 1, further comprising:
    a processor device for determining a set of nominal occluded segments of the optically identifiable element in the space, wherein the position processor further compensates the occlusion property for the nominal occluded segments.

12. The system of claim 11, wherein the processor device further designates an occluded segment of the optically identifiable element as a nominal occluded segment if a duration of the occlusion exceeds a threshold.

13. The system of claim 1, further comprising:
    an occlusion analysis processor for analyzing optical properties of at least a spatial region in at least one captured image of all pixels corresponding to at least one of (i) the optically identifiable element and (ii) an occluding object.

14. The system of claim 1, further comprising:
    a camera containing unit with containing regions that allow incorporation of (i) at least one portable camera or (ii) at least one portable device with a camera.

15. The system of claim 1, further comprising:
    at least two portable devices with a camera; and
    a processor for executing software for coordinating between the at least two portable devices with a camera, the coordinating at least involving comparing captured images from the at least two portable devices with a camera.

16. A method of determining a position characteristic for an object in a space, the method comprising:

positioning an optically identifiable element having a width at least 10 times more than a height thereof on a vertical surface proximal to a ground surface in a detection area of the space by a largest distance from the ground surface of no more than 50 cm, the optically identifiable element having an optical property;

positioning a camera across the detection area from the optically identifiable element, the camera capturing an image that comprises (i) the detection area and (ii) the optically identifiable element, wherein the image further comprises an image plane of pixels (u,v) extending in a horizontal direction and in a vertical direction, where u is a vertical axis and v is a horizontal axis;

detecting the optically identifiable element in the image in response to the optical property;

determining an occlusion property for an occlusion of the optically identifiable element in the image in response to the optical property, wherein the occlusion property includes at least one of an image position and an image size of an occluded segment of the optically identifiable element; and determining (i) an image characteristic of an image object in the image associated with the occluded segment of the optically identifiable element, wherein the image characteristic is indicative of an extension of the image object in an image direction away from the optically identifiable element, (ii) a segment border in the image between (ii)(a) an image region where the image object is mapped and (ii)(b) an image region where the image object touches a floor of the space in the image and (iii) a depth position for the object in the detection area in response to (iii)(a) the occlusion property, further in response to (iii)(b) the image characteristic of the image object, and still further in response to (iii)(c) a u-coordinate for the image object that represents a vertical image distance between a line corresponding to the optically identifiable element and the segment border such that only a portion of an image object segment extending below the line is considered, and wherein the depth position is indicative of a position of the object along an optical axis of the camera.

* * * * *